(12) United States Patent
Lavertu

(10) Patent No.: US 10,316,761 B2
(45) Date of Patent: Jun. 11, 2019

(54) VEHICLE PROPULSION SYSTEM AND METHOD OF CONTROLLING THE SAME

(71) Applicant: GENERAL ELECTRIC COMPANY, Schenectady, NY (US)

(72) Inventor: Thomas Michael Lavertu, Niskayuna, NY (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 51 days.

(21) Appl. No.: 15/192,586

(22) Filed: Jun. 24, 2016

(65) Prior Publication Data

US 2017/0370304 A1    Dec. 28, 2017

(51) Int. Cl.
| | |
|---|---|
| *F02M 25/03* | (2006.01) |
| *F02D 41/00* | (2006.01) |
| *F02D 41/02* | (2006.01) |
| *F02D 41/14* | (2006.01) |
| *F02D 1/16* | (2006.01) |
| *F02B 39/10* | (2006.01) |
| *F02B 37/04* | (2006.01) |
| *F02B 37/14* | (2006.01) |
| *B60K 6/46* | (2007.10) |

(52) U.S. Cl.
CPC .................. *F02D 1/16* (2013.01); *B60K 6/46* (2013.01); *F02B 37/04* (2013.01); *F02B 37/14* (2013.01); *F02B 39/10* (2013.01); *F02D 41/0007* (2013.01); *F02D 2200/0414* (2013.01); *F02D 2200/701* (2013.01); *F02D 2200/703* (2013.01)

(58) Field of Classification Search
None
See application file for complete search history.

(56) References Cited

U.S. PATENT DOCUMENTS

| | | | |
|---|---|---|---|
| 2,525,472 A | 10/1950 | Baston | |
| 5,561,602 A * | 10/1996 | Bessler | ..................... B60L 3/00 123/41.13 |
| 6,104,148 A | 8/2000 | Kumar et al. | |

(Continued)

FOREIGN PATENT DOCUMENTS

CN     2937502 Y     8/2007

OTHER PUBLICATIONS

Balis C et al., "Design & Development of E-Turbo for Suv and Light Truck Applications", Aug. 24, 2003.

(Continued)

*Primary Examiner* — Adam D Tissot
(74) *Attorney, Agent, or Firm* — Christopher R. Carroll; The Small Patent Law Group LLC

(57) ABSTRACT

A vehicle propulsion system includes a controller configured to generate a control signal that dictates operation of a propulsion system of a vehicle having an engine and an electrically driven superturbocharger or a turbo-compounding turbine. Responsive to determining that the vehicle is one or more of entering into or traveling within an airflow restricting area, the controller is configured to change the operation of the propulsion system of the vehicle by reducing a power output by the engine. The controller is configured to reduce the power output by the engine to increase a power output of the electrically driven superturbocharger or the turbo-compounding turbine to propel the vehicle through the airflow restricting area.

16 Claims, 2 Drawing Sheets

(56) References Cited

U.S. PATENT DOCUMENTS

| | | | |
|---|---|---|---|
| 6,152,546 | A | 11/2000 | Daigle |
| 6,499,815 | B1 | 12/2002 | Daigle |
| 6,735,945 | B1 | 5/2004 | Hall et al. |
| 7,072,747 | B2 | 7/2006 | Armbruster |
| 7,237,381 | B2 | 7/2007 | Kolavennu et al. |
| 7,285,926 | B2 | 10/2007 | McGarry et al. |
| 8,371,230 | B2 | 2/2013 | Kumar |
| 8,988,016 | B2 | 3/2015 | Daigle et al. |
| 9,074,542 | B2 * | 7/2015 | Henry .................. F02D 41/021 |
| 9,096,295 | B2 | 8/2015 | Gemin |
| 9,209,736 | B2 | 12/2015 | Daigle |
| 2016/0069252 | A1 * | 3/2016 | Lavertu .................. F02B 37/10 123/435 |

OTHER PUBLICATIONS

Zhang et al., "With the electrical properties of a new turbocharger", Mechanic Automation and Control Engineering (MACE), 2010 International Conference on, pp. 3465-3468, Jun. 26-28, 2010, Wuhan.

* cited by examiner

US 10,316,761 B2

VEHICLE PROPULSION SYSTEM AND METHOD OF CONTROLLING THE SAME

FIELD

Embodiments of the inventive subject matter described herein relate to propulsion systems of vehicles and methods for controlling the propulsion systems.

BACKGROUND

Vehicles having propulsion systems that combust fuel may travel though areas that reduce the flow or air or oxygen content in the air that negatively impact performance of the propulsion systems. These areas can be referred to as airflow restricting areas, and may result in less air being available for combustion by the propulsion systems. As a result, the power generated by the propulsion systems to propel the vehicles may be significantly decreased during travel in these areas. Examples of such fresh airflow restricting areas include tunnels and valleys.

BRIEF DESCRIPTION

In one embodiment, a system includes a controller configured to generate a control signal that dictates operation of a propulsion system of a vehicle having an engine and an electrically driven superturbocharger or a turbo-compounding turbine. Responsive to determining that the vehicle is one or more of entering into or traveling within an airflow restricting area, the controller is configured to change the operation of the propulsion system of the vehicle by reducing a power output by the engine. The controller is configured to reduce the power output by the engine to increase a power output of the electrically driven superturbocharger to propel the vehicle through the airflow restricting area.

In one embodiment, a method includes controlling operation of a propulsion system of a vehicle having an engine and an electrically driven superturbocharger or a turbo-compounding turbine during movement of the vehicle outside of an airflow restricting area, determining entry of the vehicle into the airflow restricting area, and changing the operation of the propulsion system of the vehicle by reducing a power output by the engine during movement of the vehicle inside the airflow restricting area responsive to determining that the vehicle entered the airflow restricting area. Reducing the power output by the combustion engine increases a power output of the electrically driven superturbocharger or the turbo-compounding turbine to propel the vehicle through the airflow restricting area.

In one embodiment, a system includes a controller configured to control a fuel injection time of one or more cylinders in an engine of a propulsion system of a vehicle that also includes an electrically driven superturbocharger or a turbo-compounding turbine. Responsive to determining that the vehicle is one or more of entering into or traveling within an airflow restricting area, the controller is configured to reduce a power output by the engine by changing the fuel injection time of the one or more cylinders of the engine of the vehicle. The controller is configured to reduce the power output by the engine to increase a power output of the electrically driven superturbocharger or the turbo-compounding turbine to propel the vehicle through the airflow restricting area.

BRIEF DESCRIPTION OF THE DRAWINGS

Reference is now made briefly to the accompanying drawings, in which.

DETAILED DESCRIPTION

In accordance with one or more embodiments described herein, systems and methods are provided for controlling vehicle propulsion systems having an electrically drivable superturbocharger or a turbo-compounding turbine (either also referred to as a hybrid turbocharger or e-turbo) during travel of vehicles through airflow restricting areas. The ability to control the speed at which the electrically drivable superturbocharger operates and to extract energy from engine exhaust as a generator allows for the total power output from a propulsion system that includes the electrically drivable superturbocharger to be increased (e.g., relative to another type of propulsion system).

The electrically drivable superturbocharger can be used to increase or maximize the power output from the propulsion system during travel in an airflow restricting area. In one embodiment, operation of an engine that provides exhaust to drive the electrically drivable superturbocharger can be modified or controlled to increase the power output from the propulsion system.

Figure 1:
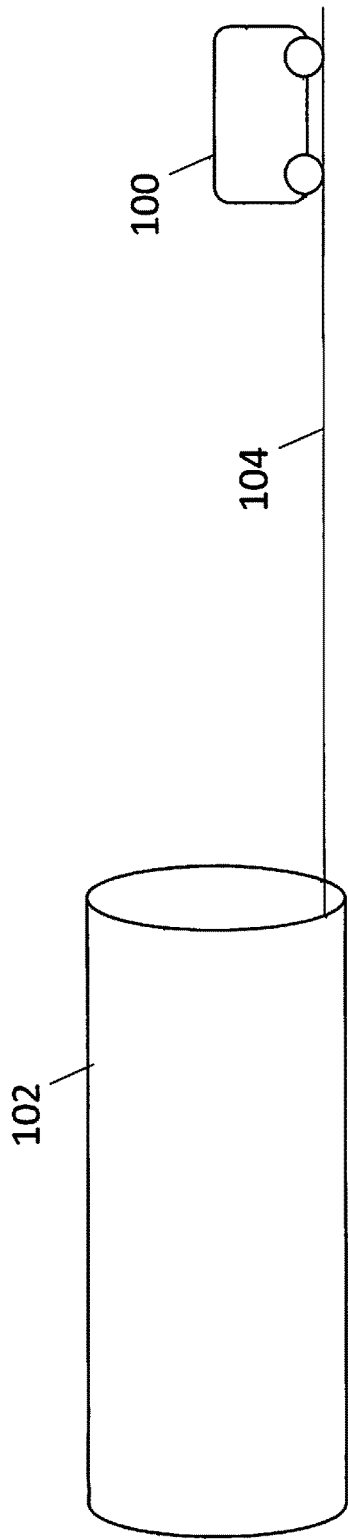
FIG. 1 illustrates travel of a vehicle toward an airflow restricted area according to one example.

FIG. 1 illustrates travel of a vehicle 100 toward an airflow restricting area 102 according to one example. The vehicle 100 can represent a propulsion-generating system, such as a rail vehicle (e.g., a locomotive), another type of off-highway vehicle (e.g., a mining vehicle or other vehicle that is not designed or is not permitted for travel on public roadways), an automobile, or the like. The vehicle 100 travels along a route 104, which can represent a track, road, or other surface. The vehicle 100 can be a stand-alone vehicle, or may be logically and/or mechanically coupled with one or more additional vehicles for traveling together along the route 104.

The route 104 passes through the airflow restricting area 102. This area 102 can represent a tunnel, valley, or other area where the flow of air is restricted relative to outside of the area 102. The area 102 may be at least partially bounded or contained within a structure or other features such that less fresh air (e.g., air with less oxygen than air outside of the area) and/or increased ambient temperatures (e.g., relative to outside of the area 102).

During travel of the vehicle 100 outside of the area 102, there may be sufficient air for a propulsion system of the vehicle 100 to consume during combustion of fuel in cylinders of the propulsion system. As a result, the vehicle 100 may generate at a variety of different power-generating levels. For example, an engine of the propulsion system may generate 3,500 horsepower (hp), 3,800 hp, 4,000 hp, or another amount of power to propel the vehicle 100 along the route 104. During travel inside the airflow restricting area 102, however, there may not be sufficient air for the engine to operate at the same range of power outputs. For example, the reduced amount of air in the area 102 for consumption during combustion of fuel may gradually restrict the engine to generating smaller power outputs. Optionally, the elevated temperature inside the area 102 (e.g., due to seasonal factors, previous passage of another vehicle through the area 102, etc.) may reduce the power output by the engine. In order to reduce or eliminate this decrease, an electrically drivable superturbocharger of the propulsion system may begin generating additional power using the exhaust from the engine. For example, if the vehicle requires 4,500 hp to move through the airflow restricting area 102 and the engine is only able to provide 3,800 hp, then the electrically drivable superturbocharger may provide 700 hp to propel the vehicle 100 at 4,500 hp. Operation of the engine may be modified in order to increase or otherwise control the power generated by the electrically drivable superturbocharger, as described below.

Figure 2:
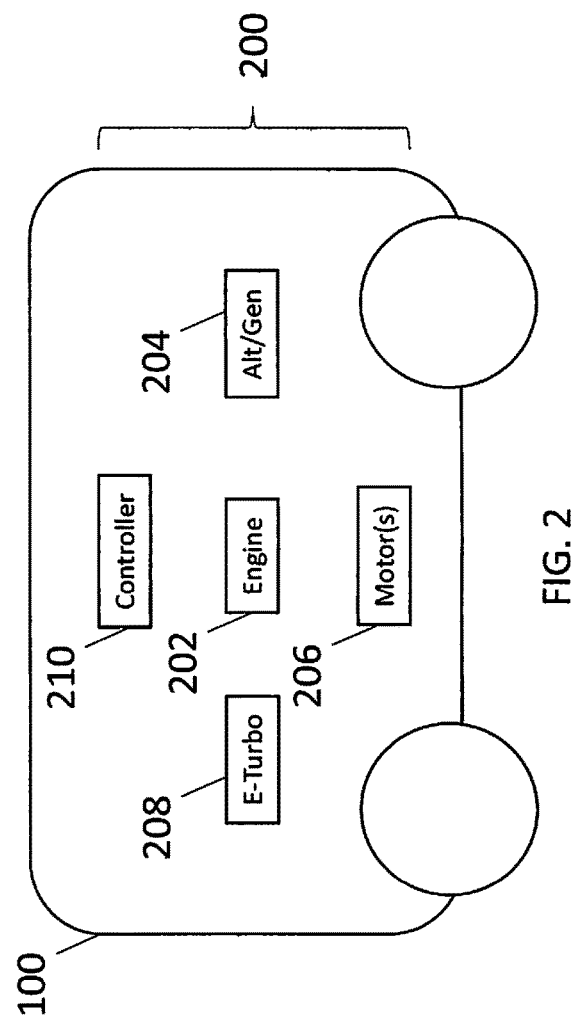
FIG. 2 schematically illustrates the vehicle shown in FIG. 1 according to one embodiment.

FIG. 2 schematically illustrates the vehicle 100 shown in FIG. 1 according to one embodiment. The vehicle 100 includes a propulsion system 200 having an engine 202 that combusts fuel and air to perform work, such as rotating a shaft connected to one or more alternators and/or generators 204 ("Alt/Gen" in FIG. 2). The engine 202 may have multiple cylinders (e.g., power cylinders) having pistons moving within the cylinders and in which fuel and air are combusted to rotate the shaft. Optionally, the propulsion system 200 may represent or include a turbo-compounding turbine mechanically coupled with the engine 202 that produces power to propel the vehicle 100.

The alternators and/or generators 204 generate electric current that is supplied to one or more motors 206 that operate to rotate axles and/or wheels of the vehicle 100 to propel the vehicle 100. At least some of the exhaust from the engine 202 may be directed into an electrically drivable superturbocharger 208 ("E-Turbo" in FIG. 2) to cause the electrically drivable superturbocharger 208 to rotate and generate electric current. The electrically drivable superturbocharger 208 can represent a turbocharger coupled with an electric turbomotor and one or more inverters. The turbocharger of the electrically drivable superturbocharger 208 is rotated by exhaust output from the engine 202 and also provides intake air to the engine 202 to increase the performance of the engine 202. For example, the turbocharger of the electrically drivable superturbocharger 208 may supply pressurized intake air to the engine 202 to increase the power output of the engine 202 (relative to the superturbocharger 208 not providing the intake air to the engine 202). The superturbocharger 208 also may be powered by electric current supplied from the one or more inverters.

In one embodiment, the superturbocharger 208 may be connected with the exhaust outlet of the engine 202 via a bypass conduit or route. For example, instead of the superturbocharger 208 being directly connected with the engine 202 such that the superturbocharger 208 receives all or substantially all of the exhaust coming from the engine 202, the superturbocharger 208 may be connected with a bypass conduit that receives some, but not all or substantially all, of the exhaust from the engine 202. Other portions of the exhaust may flow out of the engine 202 without being directed toward or into the superturbocharger 208. The amount of exhaust that is directed to the superturbocharger 208 can be balanced with respect to the amount of fresh air going into the engine 202 to ensure that the engine 202 is able to continue operating.

A controller 210 represents hardware circuitry that includes and/or is connected with one or more processors (e.g., one or more microprocessors, field programmable gate arrays, or integrated circuits) that operate to control the other components of the propulsion system 200. For example, the controller 210 may generate control signals that are communicated to the engine 202 and/or electrically drivable superturbocharger 208 to dictate the power generated by the engine 202 and/or the electrically drivable superturbocharger 208. These control signals may be based on input received by the controller 210 from one or more input devices (e.g., throttles, pedals, or the like).

Figure 3:
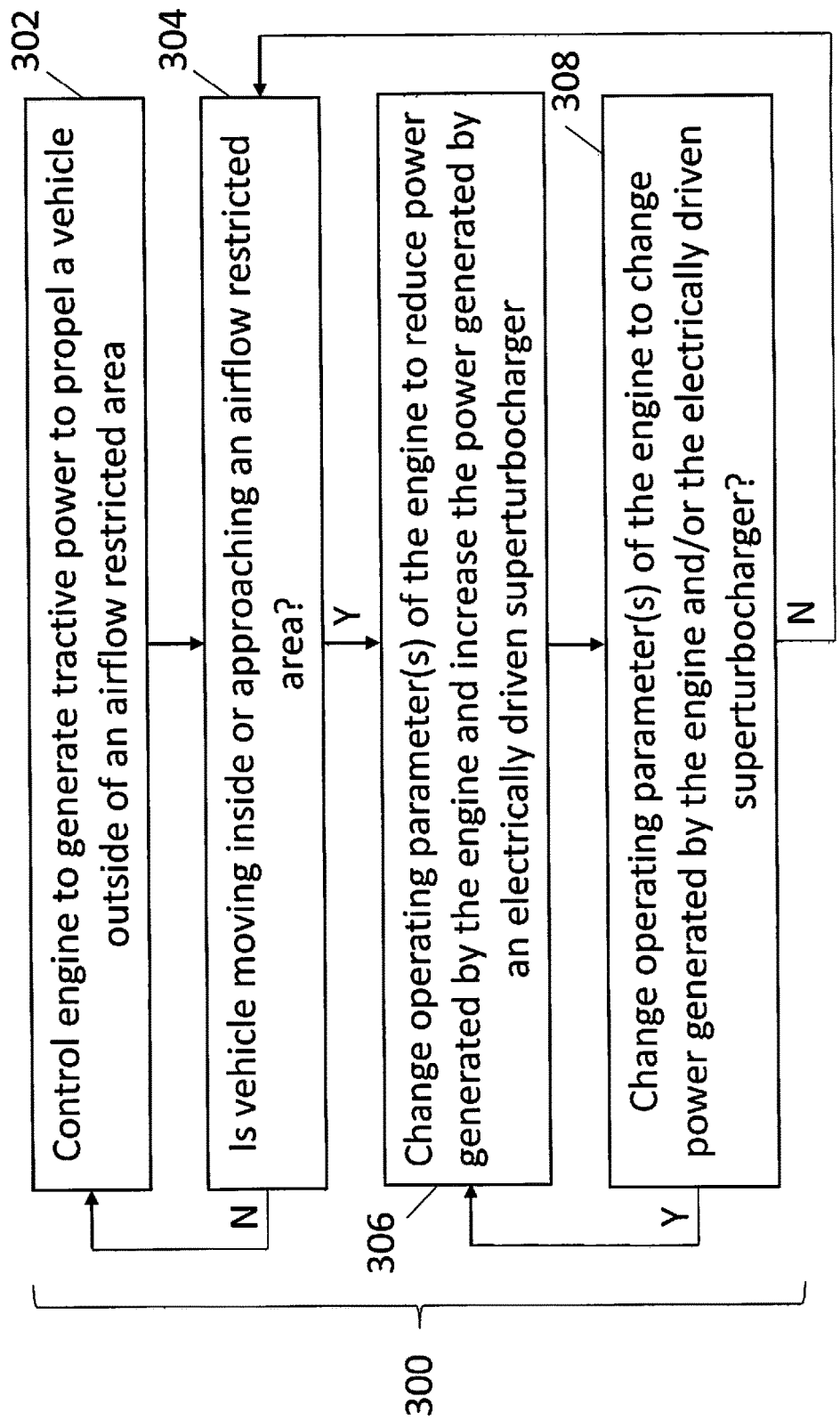
FIG. 3 is a flowchart of one embodiment of a method for controlling operation of a propulsion system of a vehicle.

FIG. 3 is a flowchart of one embodiment of a method 300 for controlling operation of a propulsion system of a vehicle. The method 300 may be used to control the propulsion system 200 of the vehicle 100 shown in FIG. 2. In one embodiment, the method 300 represents the operations performed by the propulsion system 200 as dictated by the control signals generated by and communicated from the controller 210. The method 300 may represent the software that operates to direct the functions performed by the controller 210, or optionally may be used to create such software.

At 302, the engine 202 is controlled to generate tractive power to propel the vehicle 100 along the route 104 during travel outside of the airflow restricting area 102. The engine 202 may be controlled based on timing settings of the pistons in the cylinders of the engine 202. For example, the pistons within the cylinders of the engine 202 may move within the cylinders using a four stroke engine cycle. During an intake stroke of the four stroke engine cycle, a piston in a combustion chamber of an engine cylinder moves downward toward a bottom dead center (BDC) location or position within the combustion chamber and air is pulled into the cylinder. During a compression stroke of the four stroke engine cycle, the piston moves upward from the BDC location in the combustion chamber toward a top dead center (TDC) location and the air in the cylinder is compressed. Fuel is injected into the cylinder above the piston relatively late in the compression stroke and/or into a subsequent power stroke of the four stroke engine cycle. The injected fuel creates an air-and-fuel mixture within the cylinder, which is ignited to combust the fuel and air inside the cylinder. The piston is moved downward from the TDC position toward the BDC position in the cylinder. This downward motion is where power is extracted and delivered from the piston and cylinder. During an exhaust stroke of the four stroke engine cycle, the piston moves upward from the BDC position toward the TDC position of an intake stroke in a subsequent four stroke engine cycle. Exhaust from the cylinder is forced out of the cylinder by the upward movement of the piston.

During travel outside of the airflow restricting area 102, fuel may be injected into the power cylinders of the engine 202 at respective designated times. For example, fuel may be injected into a first cylinder of the engine 202 at a first designated time, fuel may be injected into another, second cylinder of the engine 202 at a different, second designated time, and so on, during the four stroke engine cycles of the cylinders of the engine 202. Operation of the engine 202 produces exhaust and tractive power. The tractive power generated by the engine 202 (e.g., in terms of the electric current supplied to the one or more motors 206) by operation of the engine 202 can propel the vehicle 100. In one embodiment, at least some of the exhaust from the engine 202 may be directed into the electrically driven superturbocharger 208 to drive the turbocharger of the electrically driven superturbocharger 208 and cause the electrically driven superturbocharger 208 to generate additional electric current that powers the one or more motors 206. Optionally, all of the exhaust from the engine 202 may be directed into the electrically driven superturbocharger 208 to drive the turbocharger of the electrically driven superturbocharger 208 and cause the electrically driven superturbocharger 208 to generate additional electric current that powers the one or more motors 206. The electrically driven superturbocharger 208 extracts energy from this exhaust (as described herein), and also may drive a compressor to deliver fresh air to the engine 202 of the vehicle 100.

At 304, a determination is made as to whether the vehicle 100 is moving in or is approaching an airflow restricting area 102. This determination may be made in order to decide whether to change operation of the engine 202 to increase the power provided by the electrically driven superturbocharger 208, as described below. The determination of whether the vehicle 100 is moving inside or approaching the area 102 may be made based on input provided by an operator of the vehicle 100. For example, the operator may actuate an input device (e.g., a button, switch, lever, touchscreen, keyboard, etc.) that informs the controller 210 that the vehicle 100 is approaching or traveling inside the area 102.

Optionally, the controller 210 may autonomously determine that the vehicle 100 is traveling inside or approaching the airflow restricting area 102. For example, the controller 210 may be communicatively coupled with one or more sensors that provide data to the controller 210 to allow the controller 210 to determine where the vehicle 100 is located relative to the airflow restricting area 102. These sensors can include a global positioning system receiver that provides data representative of the geographic location of the vehicle 100, a wireless antenna that provides triangulation data representative of the geographic location of the vehicle 100, a roadside reader that wirelessly reads location information from stationary devices (e.g., radiofrequency identification tags) disposed alongside the route 104, a speed sensor (e.g., a tachometer) that provides data representative of the moving speed of the vehicle 100 to allow the controller 210 to calculate the location of the vehicle 100 using dead reckoning, etc. The location of the airflow restricting area 102 may be stored in a memory device (e.g., a computer hard drive, disc, etc.) that is accessible by the controller 210 to determine whether the vehicle 100 is traveling in or approaching the airflow restricting area 102. Optionally, a sensor on the engine 202 can measure ambient pressure, ambient temperature, turbocharger speed, and/or intake manifold temperature (MAT) to determine whether the vehicle 100 is inside or outside of the area 102. The MAT is the temperature of the intake gas prior to (or just prior to) the gas entering the cylinders. The ambient pressure, ambient temperature, turbocharger speed, and/or MAT may increase upon entry into and/or travel within an airflow restricting area 102 relative to travel outside of the area 102. Optionally, the MAT may decrease and/or the ambient pressure may decrease responsive to travel in the area 102.

If the vehicle 100 is moving inside or is approaching (e.g., within a designated distance, such as one hundred meters) the airflow restricting area 102, then the operation of the engine 202 may be changed to increase the power provided by the electrically driven superturbocharger 208. This increased power may be needed to supplement the power provided by the engine 202, which may decrease due to travel within the airflow restricting area 102. As a result, flow of the method 300 can proceed toward 306.

But, if the vehicle 100 is not moving inside or is not approaching the airflow restricting area 102, then operation of the engine 202 may not need to be changed due to the power provided by the engine 202 decreasing due to travel within the airflow restricting area 102. Operation of the engine 202 may be changed based on other factors, such as travel over an inclined section of the route 104, an increased headwind against the vehicle 100, etc., but may not need to be changed based on travel in the airflow restricting area 102. As a result, flow of the method 300 can return toward 302 or may terminate.

At 306, operation of the engine 202 is changed. The controller 210 can vary one or more operational parameters of the engine 202 to cause the engine 202 to produce less tractive power, but also produce exhaust having greater energy. The increased energy of this exhaust can drive the electrically driven superturbocharger 208 to produce more power (relative to the exhaust of the engine 202 having less energy). Additionally or alternatively, the operational parameters of the engine 202 may be changed in order to better utilize the exhaust energy that is available in order to extract more work out of the exhaust (e.g., relative to not changing the operational parameter(s)). For example, the speed at which the superturbocharger 208 operates may be reduced to cause more work to be extracted from the exhaust. This can result in less fresh airflow being supplied to the engine 202. The operational parameters can be varied or modified as tradeoffs between increased power output from the superturbocharger 208 and getting sufficient fresh air to the engine 202. If performance or output of the engine 202 is decreased too much, then the operational parameters of the superturbocharger 208 can be modified to cause more fresh air to be delivered to the engine 202.

In contrast to some known techniques for propelling a vehicle through a tunnel that involve increasing the power generated by the engine to get the vehicle through and out of the tunnel as quickly as practicable, the method 300 may involve decreasing the power generated by the engine 202. The power generated by the engine 202 may be decreased by varying operational parameters of the engine 202 to cause the engine 202 to produce exhaust having hotter temperatures (relative to other operational parameters of the engine 202). In one embodiment, the injection timing of one or more cylinders of the engine 202 is changed relative to travel outside of the airflow restricting area 102. Optionally, the power output from the electrically driven superturbocharger 208 can be controlled by the controller 210 changing the speed at which the superturbocharger 208 operates. For example, if the speed of the superturbocharger 208 is reduced by the controller 210, more power is extracted from the superturbocharger 208, but there will be less boost produced by the propulsion system 200.

With respect to the injection timing, the times during the four stroke engine cycle at which fuel is injected into the cylinders of the engine 202 may be delayed or pushed back for one or more, or all, of the cylinders in the engine 202. The controller 210 can communicate control signals to fuel injectors of the engine 202 to change the times at which fuel is injected into one or more of the cylinders of the engine 202. The delayed fuel injection times can cause the cylinders to produce less power, but also can cause the exhaust generated in the cylinders to be hotter. As a result, the engine 202 produces hotter exhaust when compared to the earlier fuel injection times. Optionally, the controller 210 can direct fuel to be injected into one or more cylinders of the engine 202 in a late post fuel injection during a power stroke of the one or more cylinders. Fuel may be injected into the cylinders during a primary fuel injection during normal operation, but the controller 210 may direct fuel injectors of the engine 202 to make an additional, secondary injection of fuel into the cylinders during the power stroke of the cylinders of the engine 202.

The increased temperature of the exhaust provides increased energy to the electrically driven superturbocharger 208 relative to the earlier fuel injection times. For example, the electrically driven superturbocharger 208 may generate increased power when the temperature of the exhaust driving the electrically driven superturbocharger 208 is increased. The hotter exhaust can increase the inlet temperature to the electrically driven superturbocharger 208, which increases the power output of the electrically driven superturbocharger 208. As a result, while the power output from the power cylinders of the engine 202 may decrease due to the change in operating parameters, the power output from the electrically driven superturbocharger 208 increases. Reducing the power output by the cylinders of the engine 202 also can assist in controlling the speeds at which the turbocharger of the electrically driven superturbocharger 208 rotates in the airflow restricting area 102 to permit additional power to be drawn from the electrically driven superturbocharger 208.

As one example, prior to entering the airflow restricting area 102, the engine 202 may be providing 4,500 hp of tractive power to propel the vehicle 100 while the electrically driven superturbocharger 208 provides no or substantially no tractive power. Responsive to entering or approaching the airflow restricting area 102, the fuel injection time of one or more power cylinders of the engine 202 may be delayed and/or the amount of fuel (e.g., fuel quantity) supplied to the cylinders of the engine 202 may be decreased in order to reduce the power provided by the engine 202 but to increase the power output by the electrically driven superturbocharger 208. For example, the power output by the engine 202 may decrease to 4,000 hp while the power output by the electrically driven superturbocharger 208 increases to 500 hp so that a total of 4,500 hp is still produced by the propulsion system 200 to propel the vehicle 100 through the airflow restricting area 102.

In one embodiment, the change in the operating parameter(s) of the engine 202 may occur autonomously. The controller 210 can determine that the vehicle 100 is inside or is approaching the airflow restricting area 102 and, responsive to making this determination, change the operating parameter(s) of the engine 202, as described above.

At 308, a determination is made as to whether any additional change to the operating parameters of the engine 202 are to be made. In one embodiment, if additional power is needed from the propulsion system 200 during travel through the airflow restricting area 102, then the fuel injection time of one or more cylinders of the engine 202 may be delayed even further. This can further increase the temperature of the exhaust and thereby increase the power supplied by the electrically driven superturbocharger 208. Conversely, if the vehicle 100 has exited from the airflow restricting area 102 and/or if less power is needed, then the delay added to the fuel injection time of one or more of the cylinders may be removed or reduced to thereby reduce the temperature of the exhaust provided by the engine 202. If additional changes to the operating parameters are to occur, then flow of the method 300 can return toward 306. Otherwise, flow of the method 300 can return toward 304. The method 300 can flow through one or more loops in this way to adjust the operating parameters of the engine 202 during travel through the airflow restricting area 102. Upon exiting the airflow restricting area 102, flow of the method 300 can return toward 302 or terminate.

In one embodiment, a system includes a controller configured to generate a control signal that dictates operation of a propulsion system of a vehicle having an engine and an electrically driven superturbocharger or a turbo-compounding turbine. Responsive to determining that the vehicle is one or more of entering into or traveling within an airflow restricting area, the controller is configured to change the operation of the propulsion system of the vehicle by reducing a power output by the engine. The controller is configured to reduce the power output by the engine to increase a power output of the electrically driven superturbocharger to propel the vehicle through the airflow restricting area.

In one example, the controller is configured to change the operation of the propulsion system by reducing a speed at which the electrically driven superturbocharger or the turbo-compounding turbine operates.

In one example, the controller is configured to change the operation of the propulsion system by changing a fuel injection time of the engine.

In one example, the controller is configured to change the operation of the propulsion system by delaying a fuel injection time of the engine.

In one example, the controller is configured to change the operation of the propulsion system by causing fuel to be injected into one or more cylinders of the engine in a post fuel injection during a power stroke of the one or more cylinders.

In one example, the controller is configured to change the operation of the propulsion system in order to increase a temperature of exhaust output by the engine and provided to the electrically driven superturbocharger or the turbo-compounding turbine to drive the electrically driven superturbocharger or the turbo-compounding turbine.

In one example, the temperature of the exhaust output from the engine that is increased also increases the power output from the electrically driven superturbocharger or the turbo-compounding turbine.

In one example, the controller is configured to determine entry of the vehicle into the airflow restricting area.

In one example, the controller is configured to autonomously change the operation of the propulsion system.

In one embodiment, a method includes controlling operation of a propulsion system of a vehicle having an engine and an electrically driven superturbocharger or a turbo-compounding turbine during movement of the vehicle outside of an airflow restricting area, determining entry of the vehicle into the airflow restricting area, and changing the operation of the propulsion system of the vehicle by reducing a power output by the engine during movement of the vehicle inside the airflow restricting area responsive to determining that the vehicle entered the airflow restricting area. Reducing the power output by the combustion engine increases a power output of the electrically driven superturbocharger or the turbo-compounding turbine to propel the vehicle through the airflow restricting area.

In one example, changing the operation of the propulsion system includes changing a fuel injection time of the engine.

In one example, changing the operation of the propulsion system includes delaying a fuel injection time of the engine.

In one example, changing the operation of the propulsion system increases a temperature of exhaust output by the engine and provided to the electrically driven superturbocharger or the turbo-compounding turbine to drive the electrically driven superturbocharger or the turbo-compounding turbine.

In one example, the temperature of the exhaust output from the engine that is increased also increases the power output from the electrically drive superturbocharger or the turbo-compounding turbine.

In one example, the entry of the vehicle into the airflow restricting area is determined as the vehicle enters into a tunnel.

In one example, changing the operation of the propulsion system is performed autonomously by a controller.

In one embodiment, a system includes a controller configured to control a fuel injection time of one or more cylinders in an engine of a propulsion system of a vehicle that also includes an electrically driven superturbocharger or a turbo-compounding turbine. Responsive to determining that the vehicle is one or more of entering into or traveling within an airflow restricting area, the controller is configured to reduce a power output by the engine by changing the fuel injection time of the one or more cylinders of the engine of the vehicle. The controller is configured to reduce the power output by the engine to increase a power output of the electrically driven superturbocharger or the turbo-compounding turbine to propel the vehicle through the airflow restricting area.

In one example, the controller is configured to change the fuel injection time by delaying the fuel injection time of the one or more cylinders.

In one example, the controller is configured to change the fuel injection time in order to increase a temperature of exhaust output by the engine and provided to the electrically driven superturbocharger or the turbo-compounding turbine to drive the electrically driven superturbocharger or the turbo-compounding turbine.

In one example, the temperature of the exhaust output from the engine that is increased also increases the power output from the electrically driven superturbocharger or the turbo-compounding turbine.

In one example, the controller is configured to determine entry of the vehicle into the airflow restricting area.

In one example, the controller is configured to autonomously change the fuel injection time.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. At least one of the following claims may represent a claim to inventive subject matter of this patent application. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
a controller configured to generate a control signal that dictates operation of a propulsion system of a vehicle having an engine and an electrically driven superturbocharger or a turbo-compounding turbine, the engine having cylinders that operate according to a four stroke cycle,
wherein, prior to determining that the vehicle is one or more of entering into or traveling within an airflow restricting area, the four stroke cycle of the cylinders in the engine includes one injection of fuel,
wherein, responsive to determining that the vehicle is one or more of entering into or traveling within the airflow restricting area, the controller is configured to change the operation of the propulsion system of the vehicle by both reducing a power output by the engine and adding a second injection of the fuel into the cylinders during a power stroke of the four stroke cycle of the cylinders,
wherein the controller is configured to reduce the power output by the engine to increase a power output of the electrically driven superturbocharger or the turbo-compounding turbine to propel the vehicle through the airflow restricting area, and
wherein the controller is configured to reduce the power output by the engine by changing injection of fuel into cylinders of the engine by delaying a fuel injection time of the cylinders relative to the fuel injection time of the cylinders prior to determining that the vehicle is one or more of entering into or traveling within the airflow restricting area.

2. The system of claim 1, wherein the controller is configured to change the operation of the propulsion system by reducing a speed at which the electrically driven superturbocharger or the turbo-compounding turbine operates.

3. The system of claim 1, wherein the controller is configured to change the operation of the propulsion system in order to increase a temperature of exhaust output by the engine and provided to the electrically driven superturbocharger or the turbo-compounding turbine to drive the electrically driven superturbocharger or the turbo-compounding turbine.

4. The system of claim 3, wherein the temperature of the exhaust output from the engine that is increased also increases the power output from the electrically driven superturbocharger or the turbo-compounding turbine.

5. The system of claim 1, wherein the controller is configured to determine entry of the vehicle into the airflow restricting area.

6. The system of claim 1, wherein the controller is configured to autonomously change the operation of the propulsion system.

7. A method comprising:
controlling operation of a propulsion system of a vehicle having an engine and an electrically driven superturbocharger or a turbo-compounding turbine during movement of the vehicle outside of an airflow restricting area, the engine having cylinders that operate according to a four stroke cycle that includes one injection of fuel;
determining entry of the vehicle into the airflow restricting area; and
changing the operation of the propulsion system of the vehicle by reducing a power output by the engine during movement of the vehicle inside the airflow restricting area and adding a second injection of the fuel into the cylinders during a power stroke of the four stroke cycle of the cylinders responsive to determining that the vehicle entered the airflow restricting area, wherein reducing the power output by the engine increases a power output of the electrically driven superturbocharger or the turbo-compounding turbine to propel the vehicle through the airflow restricting area, and wherein reducing the power output by the engine comprises changing injection of fuel into cylinders of the engine by delaying a fuel injection time of the cylinders relative to the fuel injection time of the cylinders prior to determining entry of the vehicle into the airflow restricting area.

8. The method of claim 7, wherein changing the operation of the propulsion system increases a temperature of exhaust output by the engine and provided to the electrically driven superturbocharger or the turbo-compounding turbine to drive the electrically driven superturbocharger or the turbo-compounding turbine.

9. The method of claim 8, wherein the temperature of the exhaust output from the engine that is increased also increases the power output from the electrically driven superturbocharger or the turbo-compounding turbine.

10. The method of claim 7, wherein the entry of the vehicle into the airflow restricting area is determined as the vehicle enters into a tunnel.

11. The method of claim 7, wherein changing the operation of the propulsion system is performed autonomously by a controller.

12. A system comprising:
a controller configured to control a fuel injection time of one or more cylinders in an engine of a propulsion system of a vehicle that also includes an electrically driven superturbocharger or a turbo-compounding turbine, the one or more cylinders operating according to a four stroke cycle,
wherein, prior to determining that the vehicle is one or more of entering into or traveling within an airflow restricting area, the four stroke cycle of the cylinders in the engine includes one injection of fuel,
wherein, responsive to determining that the vehicle is one or more of entering into or traveling within an airflow restricting area, the controller is configured to reduce a power output by the engine by (a) delaying the fuel injection time of the one or more cylinders of the engine of the vehicle relative to the fuel injection time of the cylinders prior to determining entry of the vehicle into the airflow restricting area and (b) adding a second injection of the fuel into the cylinders during a power stroke of the four stroke cycle of the cylinders.

13. The system of claim 12, wherein the controller is configured to change the fuel injection time in order to increase a temperature of exhaust output by the engine and provided to the electrically driven superturbocharger or the turbo-compounding turbine to drive the electrically driven superturbocharger or the turbo-compounding turbine.

14. The system of claim 13, wherein the temperature of the exhaust output from the engine that is increased also increases the power output from the electrically driven superturbocharger or the turbo-compounding turbine.

15. The system of claim 12, wherein the controller is configured to determine entry of the vehicle into the airflow restricting area.

16. The system of claim 12, wherein the controller is configured to autonomously change the fuel injection time.

* * * * *